United States Patent

[11] 3,527,192

| [72] | Inventor | Thomas Ferrara |
| | | 1154 Webster Ave., New Rochelle, New York 10804 |
| [21] | Appl. No. | 762,407 |
| [22] | Filed | Sept. 25, 1968 |
| [45] | Patented | Sept. 8, 1970 |

[54] PET FEEDER BOWL HAVING REPLACEABLE INSERT
2 Claims, 3 Drawing Figs.

| [52] | U.S. Cl. | 119/61, 220/63 |
| [51] | Int. Cl. | A01k 5/00 |
| [50] | Field of Search | 119/61; 220/63, 17 |

[56] References Cited
UNITED STATES PATENTS

| 2,928,372 | 3/1960 | Farley | 119/61 |
| 3,352,449 | 11/1967 | Jackson | 220/63 |
| 3,412,888 | 11/1968 | Andrews et al. | 220/17X |

Primary Examiner—Hugh R. Chamblee
Attorney—Charles E. Temko

ABSTRACT: A pet feeding bowl including a relatively rigid base element defining a cavity, and a replaceable insert or liner selectively engageable therewith, the liner being formed as a result of vacuum molding wherein a central portion thereof is of reduced thickness and increased flexibility as compared with side walls to which it is attached, insertion of the insert element into the cavity in the base element, causing air trapped therebetween to flex the thinner portion of the insert to form a pocket of air therebetween which facilitates removal of the insert element after use.

Patented Sept. 8, 1970

3,527,192

PET FEEDER BOWL HAVING REPLACEABLE INSERT

This invention relates generally to the field of feeder bowls for domestic animals, and more particularly to an improved type having a replaceable insert which may be removed when soiled, thus eliminating the need for washing the same.

It is generally known in the art to provide dishes with disposable liners, whereby the need for washing the dish after use is eliminated. The most usual type of disposable liner is made of paper, which has been coated with a suitable resin to make the same water resistant, and more recently, synthetic resinous inserts have also been known.

Pet feeder bowls having means to prevent the same from being accidentally upset are also known in the art, and usually consist of a molding which forms an outer wall, the lower edge of which contacts a horizontal supporting surface, and an inner wall which defines a cavity in which the food for the pet is placed. The bowl is normally quite deep, to accommodate for the muzzle of the animal, and reduce spillage as much as possible. Such bowls, while washable, present a distasteful problem to the pet owner, owing to the fact that the remaining food has often decayed or become otherwise unsanitary. Paper inserts, shaped to fit bowls of this type are difficult to fabricate, and synthetic resinous liners, while capable of being formed have a disadvantage in that the relatively deep side walls thereof tend to adhere to the corresponding wall of the bowl, making the removal thereof difficult. This difficulty is additionally complicated by the fact that very often the liner contains uneaten food which can be easily spilled if care is not exercised.

It is among the principal objects of the present invention to provide an improved combination pet feeder bowl and replaceable insert or lining element, in which the difficulty of removal has been substantially reduced.

Another object of the invention lies in the provision of a device of the class described in which the insert lining elements may be conveniently vacuum molded at very low cost.

A further object of the invention lies in the provision of an improved pet feeding device, which, in an emergency, may be used in normal manner without a replaceable insert element.

Yet another object of the invention lies in the provision of an improved pet feeding device in which the removable insert or lining element is not easily accidentally removed.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
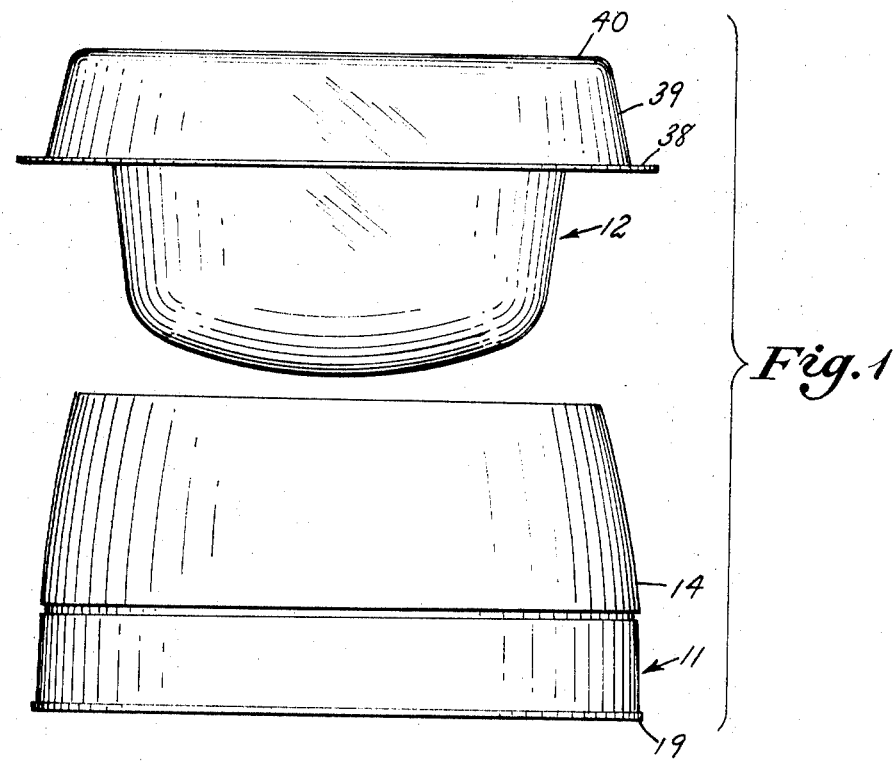
FIG. 1 is an exploded view in elevation showing the separable elements comprising an embodiment of the invention.
Figure 2:
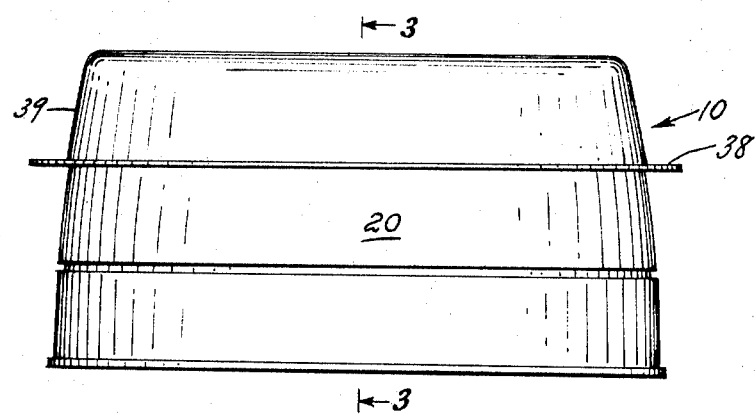
FIG. 2 is a side elevational view thereof showing the same in interconnecting relation.

In accordance with the invention, the device, generally indicated by reference character 10, comprises broadly: a base element 11 and a replaceable insert or liner element 12.

The base element 11 is preferably formed from injection molded polyethylene, or other synthetic resinous material having similar properties. It includes an outer wall member 14, an upper wall member 15, an inner wall member 16 and a bottom wall member 17.

Figure 3:
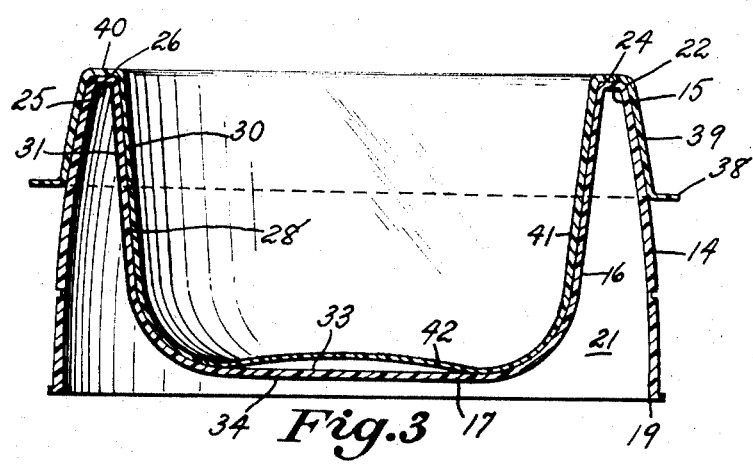
FIG. 3 is a vertical central sectional view as seen from the plane 3—3 in FIG. 2.

The outer wall member 14 terminates in a lower edge 19, and is bounded by an outer surface 20 and an inner surface 21. As best seen in FIG. 3, the wall is of tapered configuration to facilitate engagement of the insert element 12. The upper wall member 15 commences at the upper edge 22 of the outer wall member 14, and extends between an upper surface 24 and a lower surface 25 to an inner edge 26.

The inner wall member 16 interconnects with the upper wall member 15, and includes a first curved portion 28 of tapering configuration, and a second portion 29, each being bounded by a common exposed surface 30 and a common concealed surface 31. The bottom wall 17 is generally planar, and interconnects with the curved portion 29 between an upper surface 33 and a lower surface 34.

The replaceable insert element 12 is preferably formed from vacuum molded sheet polystyrene, or cellulose acetate, and is configured to conform to the base element 11 to be frictionally retained thereon. Accordingly, it includes an outer radially extending flange 38, an outer wall 39, an upper wall 40, an inner wall 41 and a bottom wall 42. As best seen in FIG. 3, the bottom wall 42 is of thickness considerably less than that of the upper wall 40, principally as a result of the vacuum forming technique employed in shaping the insert element, wherein material is taken from the bottom wall to form the inner wall. Where the depth of the inner wall 40 is of the order of several inches, and the diameter of the recess formed by the wall is approximately five or six inches, the bottom wall of the insert element may be drawn as thin as several thousandth of an inch, causing the same to have a paper-like flexibility.

Accordingly, when the insert element is placed within the base element, as seen in FIG. 3, air trapped within the recess formed by the inner wall member 16 and bottom wall member 17 prevents the precise mating of the bottom wall 42 with the bottom wall 17, the trapped air forming an interstice 43.

As a result, the insert element is retained within the base element principally by the frictional forces existing between the elements when an attempt is made to remove the same, and not as a result of atmospheric pressure upon the bottom wall 42, which, because of the relatively large area thereof perpendicular to the line of movement of the insert element during removal would be a far greater force to overcome. The frictional forces existing between the engaged surfaces of the elements are readily overcome by grasping the flange 38 while holding the outer wall member 14, whereby the insert element may be completely disengaged and discarded with its remaining contents, if any.

I wish it to be understood that I do not consider the invention limited to the precise details of structure shown and set forth in this specification, for obvious modifications will occur to those skilled in the art to which the invention pertains.

I claim:

1. A pet feeding device comprising in combination:

a base element and a selectively engageable insert element;

said base element including inner and outer tapered walls converging in an upward direction, an upper wall interconnecting said inner and outer walls, and a bottom wall interconnecting with a lower edge of said inner wall to define a food receiving recess;

said insert element including inner, outer and upper walls, corresponding in size and configuration to the inner, outer and upper walls of said base element, and having a corresponding bottom wall interconnected to said inner wall at a lower edge thereof and having a thickness less than that of said inner wall, whereby the same may have a high degree of flexibility greater than that of the other parts of said insert element; and whereby movement of said insert element into engagement with said base element causes air trapped therebetween to flex said bottom wall of said insert element to form an interstice filled with said entrapped air, preventing the adherence of said bottom wall to said bottom wall of said base element, to facilitate disengagement of said insert element from said base element after use.

2. Structure in accordance with claim 1, said insert element including a manually engageable flange projecting radially outwardly of a lower edge of said outer wall thereof.